United States Patent

[11] 3,605,042

[72] Inventor Earl E. Rapp
Decatur, Ill.
[21] Appl. No. 887,114
[22] Filed Dec. 22, 1969
[45] Patented Sept. 14, 1971
[73] Assignee General Electric Company

[54] TREBLE CONTROL CIRCUIT
6 Claims, 4 Drawing Figs.

[52] U.S. Cl. .................... 333/28 T, 84/1.27, 330/31, 330/192
[51] Int. Cl. .................... H03h 7/06, H03h 7/10
[50] Field of Search .................... 330/31, 128, 192; 333/28, 18; 325/424; 84/1.11, 1.21, 1.27, 1.12

[56] References Cited

UNITED STATES PATENTS

| | | | |
|---|---|---|---|
| 2,028,511 | 1/1936 | Lewis | 325/426 |
| 2,680,231 | 6/1954 | Reed, Jr. | 333/28 |
| 2,680,232 | 6/1954 | Claras et al. | 333/28 |
| 2,900,609 | 8/1959 | Estkowski | 333/28 |
| 3,349,331 | 10/1967 | Anthun | 325/424 |
| 3,452,282 | 6/1969 | Beres | 325/424 |

*Primary Examiner*—Herman Karl Saalbach
*Assistant Examiner*—Marvin Nussbaum
*Attorneys*—Stanley C. Corwin, W. Joseph Shanley, Frank L. Neuhauser, Oscar B. Waddell and W. J. Shanley

ABSTRACT: A treble tone control circuit in an audio amplifier comprising the series arrangement of a first capacitor connected to one of a pair of circuit input leads, a treble control potentiometer, and a second capacitor connected between the treble control potentiometer and a point on the volume control potentiometer of the amplifier. The wiper on the treble control potentiometer is connected to the other circuit input lead and a third capacitor is connected between the same point on the volume control potentiometer to which the second capacitor is connected and a second point on the volume control potentiometer. This circuit provides an increased treble cut with little or no midband attenuation and a greater maximum treble cut as the treble compensation circuit is progressively disabled.

INVENTOR
EARL E. RAPP

BY Thomas A. Briody
ATTORNEY

INVENTOR
EARL E. RAPP

BY Thomas A. Briody
ATTORNEY

TREBLE CONTROL CIRCUIT

BACKGROUND OF THE INVENTION

This invention relates to a treble control circuit. More particularly, this invention relates to an improved treble control circuit having little or no midband attenuation and greater maximum treble cut as the treble compensation circuit is progressively disabled.

It is often necessary, particularly in low-level audio amplifiers, such as preamplifiers in stereophonic systems, to provide some type of frequency-compensation network to enhance either the low frequency or the high frequency portions of the amplified signal. Quite often, such frequency-compensation networks comprise various combinations of resistances and capacitances either in series with the output signal from the amplifier stage or in shunt with that output signal, or both, in such a manner to utilize the effectively low impedance of the capacitor to high frequencies, and its effectively high impedance to low frequencies in order to select the desired overall frequency response.

By using variable resistors in circuitry with the capacitors, the frequency response may be selected by adjusting the bass boost and cut, and treble boost and cut to the desires of the listener. Such variable resistors or potentiometers thus function as tone controls for the audio amplification circuit. It is however, desirable in the use of tone controls to minimize the flow of direct currents through the controls so that little or no noise will be generated by the movable contact. Thus, it is often preferable to isolate the tone controls from the direct current biasing source for the audio amplifier.

As is known in this art, when there is less attenuation to low frequencies than to high frequencies relative to midband frequencies, the bass response is said to be boosted and when there is more attenuation to low frequencies than to high frequencies the bass response is said to be cut. Similarly, the treble or high frequencies may be also boosted and cut according to the desires of the listener when a treble tone control circuit is provided.

These types of circuits for modifying the frequency characteristics are either introduced directly into the signal path or are provided in a feedback network. When circuits for modifying frequency response are introduced directly into the signal path, as in the case of this invention, it is also a problem to minimize the loss in using the various combinations of resistance-capacitance signal-attenuating networks, particularly when such circuits are utilized with transistorized driver stages.

It is an additional problem in using interstage frequency-compensating networks to provide a sufficient treble cut at loudness levels less than maximum. Ordinarily, a sufficient treble cut may be achieved at the maximum loudness by conventional capacitive shunting networks. However, at a decreased output volume, the treble compensation networks begin to take effect in such a manner that the treble is maintained. Thus, the ear of the listener hears an apparent relative treble boost at the lower loudness levels even as the treble boosting effect is cut. Thus, it is a problem in the art to increase the maximum treble cut as the treble tone control is adjusted toward its minimum position particularly at lower loudness levels.

Accordingly, it is an object of this invention to provide an interstage frequency compensation network which provides an increased maximum treble cut which is accompanied by little or no midband attenuation.

It is another object of this invention to provide an interstage frequency compensation network for an audio amplifier which progressively disables the treble compensation network to provide for a greater maximum treble cut.

It is a further object of this invention to provide a circuit which minimizes the effect of a treble boosting circuit as the treble tone control is reduced to a lower setting.

BRIEF SUMMARY OF THE INVENTION

An interstage frequency-compensation network designed to overcome the problems of the prior art and to achieve the objects of this invention comprises an interstage coupling circuit having an input circuit coupled to the output of a transistorized audio amplifier stage which may include bass tone control circuits, contour-shaping circuits, and bass boost circuits. The output circuit of the treble frequency response compensation circuit according to the invention includes a volume control or output potentiometer connected across the output terminals thereof, and the output of the stage is taken from the variable tap on the volume control potentiometer. The improved treble tone control circuit includes a series circuit which comprises a first capacitor connected to one terminal of a treble tone control potentiometer preferable having S-taper characteristics. A second capacitor is connected to a second terminal on the treble tone control potentiometer and to a point on the output potentiometer. The variable tap on the treble tone control potentiometer is connected to an end of the output of the volume control potentiometer. A third capacitor is connected between the second capacitor of the treble tone control circuit and a second point on the output potentiometer. The circuit according to the invention thus provides treble cut with little or no midband attenuation, and a greater maximum treble cut as the treble compensation network is progressively disabled. The use of an S-taper control potentiometer in the circuit according to the invention provides an increased linear control action as the treble control dial is manipulated.

DESCRIPTION OF THE PREFERRED EMBODIMENTS

Figure 1:
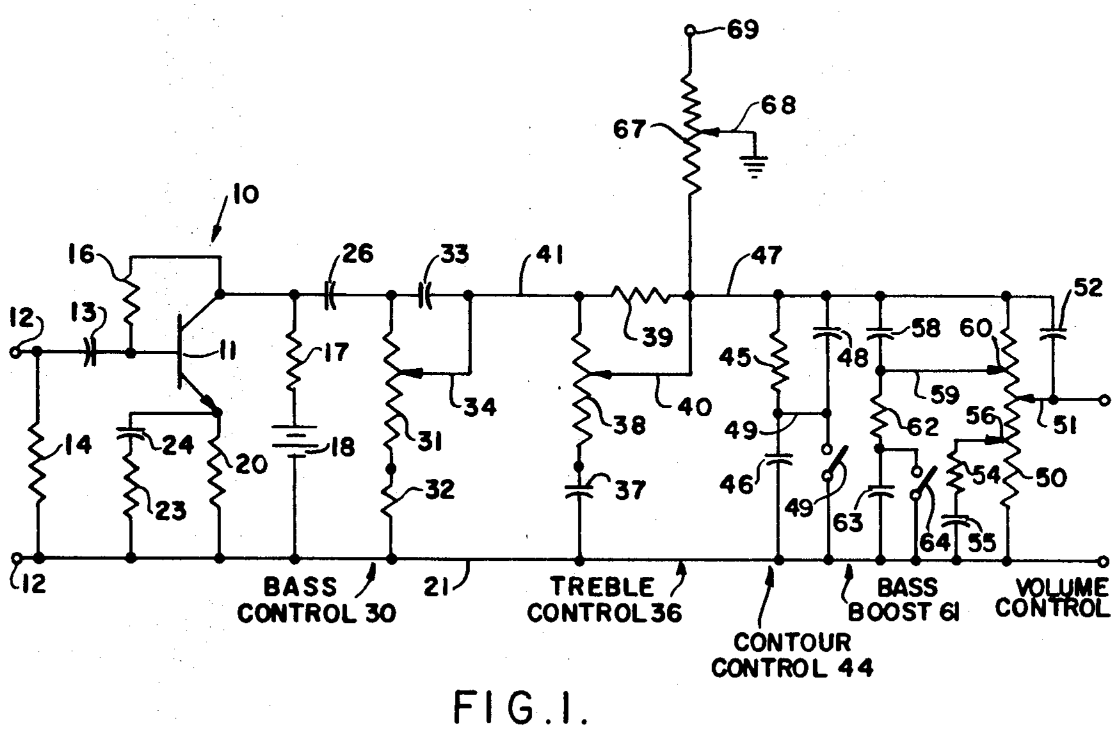
FIG. 1 shows a conventional audio amplifier having bass and treble tone control circuits coupled to the output thereof.

In FIG. 1, a transistorized audio amplifier stage is designated generally at 10 and includes a transistor 11 having its base coupled to a source of audio signals provided between a pair of input terminals 12. Capacitor 13 couples the input signals from the input terminal 12 to the base of transistor 11. An input resistor 14 is connected between the input terminals 12 to provide a discharge path for the coupling capacitor and to provide the desired input impedance for the overall circuit. A resistor 16 is connected between the collector of the transistor 11 and its base to provide negative feedback both for biasing and for stabilization of the transistor 11. The collector of the transistor 11 is also connected to a load resistor 17 in circuit with a source of biasing potential 18, illustrated in FIG. 1 as a battery. An emitter resistor 20 is connected between the emitter of transistor 11 and lead 21 which is in circuit with one of the input terminals 12. If desired, lead 21 may also be connected to a source of reference potential, such as ground. An emitter bypass network comprising resistor 23 in series with capacitor 24 is connected in parallel with the emitter resistor 20. The emitter bypass network provides a treble boost to the output from transistor 11 at its collector by reducing the effective emitter impedance at high frequencies as determined by the parallel impedance combination of resistor 20, resistor 23 and capacitor 24.

The amplified audio output from the transistor 11 is taken from its collector through coupling capacitor 26 which also provides for direct current isolation for the interstage frequency compensation networks from the transistorized driver stage 10.

A bass tone control circuit is designated generally at 30. The bass tone control circuit comprises a potentiometer 31 in series with a fixed resistor 32 and is connected between the lead 21 and one of the terminals of the coupling capacitor 26 for receiving the amplified output signals from amplifier 10. A bass control capacitor 33 is connected between the variable tap 34 of the potentiometer 31 and one end thereof in a series relationship with the output signal from the coupling capacitor 26.

In operation, when the wiper 34 of the bass control potentiometer 31 is in its upper position, the capacitor 33 is effectively shorted and the signals from the coupling capacitor 26 may pass unattenuated. On the other hand, when the wiper 34 is in its lowest position adjacent to the fixed resistor 32, the combination of the variable resistance 31 in parallel with the impedance presented to low frequencies by the capacitor 33 act as a high pass filter by effectively attenuating the low components in the composite signal. The degree of attenuation determines the overall effect on the low frequency signals.

A conventional treble tone control circuit is designated generally at 36 as comprising a capacitor 37 in series with a treble tone control potentiometer 38 with a fixed resistor 39 connected between the variable tap of the potentiometer and one end thereof. The resistor 39 is in a series relationship with the output from the bass bone control circuit 30 and receives the amplified audio frequency signals from the amplifier stage 10. When the wiper 40 on the potentiometer 38 is in its lowermost position adjacent capacitor 37, the capacitor 37 effectively is connected in series with the resistor 39 between lead 41 and lead 21 to provide a low-impedance shunting path to high frequency signals. On the other hand, when the wiper 40 on the potentiometer 38 is near its uppermost position, the maximum available resistance of the potentiometer 38 is in series with the capacitor 37 to decrease its shunting effect, thus to provide a treble tone control. Except when the wiper 40 is in its uppermost position, the fixed resistance 39 and a portion of the potentiometer is in series with the audio frequency signals on lead 41 and causes attenuation of the midband frequencies.

A contour control circuit is shown generally at 44 and comprises a resistor 45 in series with a capacitor 46, the series combination of which is connected between lead 47 and lead 21. A capacitor 48 is connected in series with a switch 49, the combination of which is also connected between lead 47 and lead 21. The terminal which is common to resistor 45 and to capacitor 46 is directly connected by way of lead 49 to the terminal which is common to both capacitor 48 and switch 49. The purpose of the contour circuit 44 is to provide high frequency roll off since the contour control circuit acts effectively as a low-pass filter.

In operation, at the desire of the listener, switch 49 may be closed to shunt capacitor 46 thus to decrease the effective shunt impedance of the contour circuit 44. When the impedance of the circuit 44 is thus decreased, the signal passing therethrough is increased so that the apparent output level from the audio signal is effectively decreased. Such a contour control circuit provides the listener with the option to reduce the output level of the signal to a volume suited for pleasant background listening.

A volume control potentiometer 50 is connected between lead 47 and lead 21. The positioning of the wiper 51 on the potentiometer 50 determines the volume output from the audio amplifier section. Thus, when the wiper 51 is in its upper position, the magnitude of signal output is at its maximum to provide maximum volume. A capacitor 52 is connected between the lead 47 and the wiper 51 to provide treble shaping. When the wiper is in its maximum position, the capacitor 52 is shunted so that, as to the incoming signal, the capacitor 52 provides no treble boost. When the wiper 51 is not in its maximum position, the capacitor 51 provides a low impedance to the output at wiper 51 and thus provides a treble boost. This treble boost is increased as the wiper 51 is moved toward the lower end of the potentiometer 50.

A bass-shaping circuit comprising resistor 54 and capacitor 55 is connected between lead 21 and a point on the potentiometer 50. When the wiper 51 is in its maximum loudness position, the bass-shaping circuit has a minimum effect since the resistance which is in series with capacitor 55 comprises resistor 54 and that portion of the resistance of potentiometer 50 which is contained between tap 56 and lead 47. On the other hand, when the wiper 51 is at a position beneath point 56, the bass-shaping circuit becomes increasingly effective.

Additional treble boost is provided at the upper loudness levels by the action of the capacitor 58 connected in series with the lead 59 to a point 60 on the variable resistor 50.

A bass boost circuit is designated generally at 61 and comprises a resistor 62 in series with a capacitor 63 and a switch 64 in parallel with the capacitor 63. The resistor 62 is connected to one terminal of capacitor 58 and to the lead 59 which is connected to a point 60 on the potentiometer 50. When it is desired to boost the frequency response of the audio signals to the low frequency ranges, switch 64 may be opened, thus introducing capacitor 63 into the circuit which does not shunt low frequencies as greatly as higher frequencies.

Since the circuit shown in FIG. 1 may comprise one channel of a stereophonic amplifier system, a balance potentiometer 67 has been illustrated having its wiper 68 connected to a source of reference potential such as ground. The potentiometer 67 is connected between lead 47 and terminal 69 which is to be connected to a point in the other stereophonic channel corresponding to lead 47. The audio balance between the two arrangements is provided by adjusting the wiper 68 on the potentiometer 67.

Figure 2:
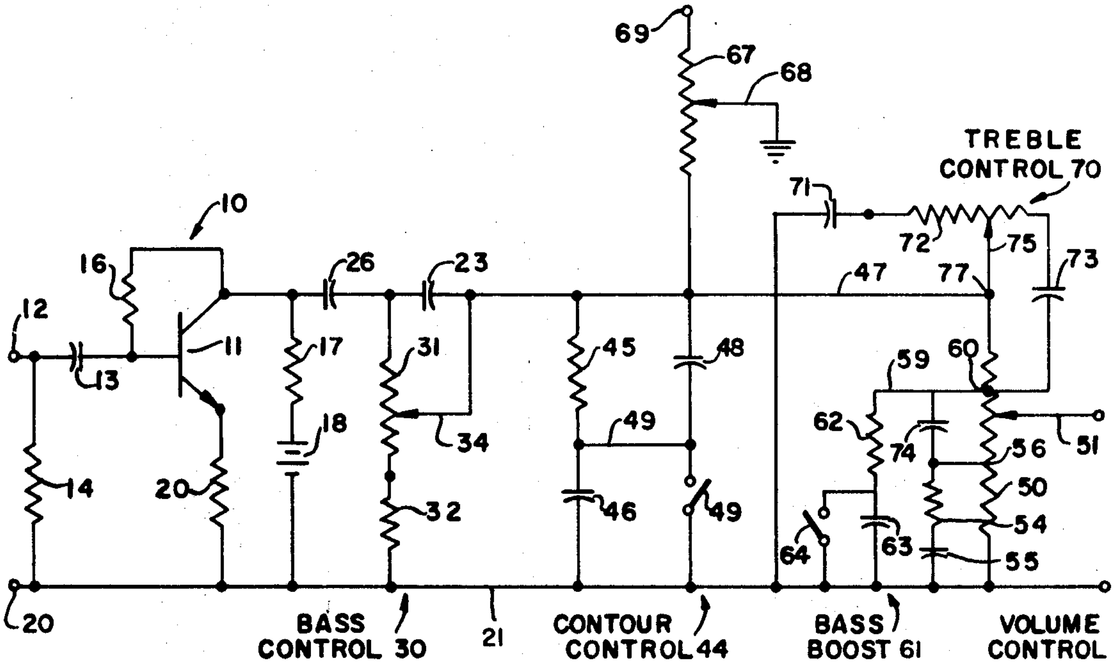
FIG. 2 shows a transistorized audio amplifier which incorporates the improved treble control circuit according to the invention.

FIG. 2 is in many respects like the circuit shown in FIG. 1 so that like reference numerals refer to like circuit parameters thereof. Thus, the amplifier 10, the bass tone control 30, the contour circuit 44, the bass boost circuit 61, and the volume control potentiometer 50 all operate as disclosed in connection with FIG. 1.

The differences between the circuits shown in FIGS. 1 and 2 are primarily found in the connections and parameters of the treble tone control circuit. The series resistor 39 in the treble tone control circuit 36 of FIG. 1 has been eliminated to reduce or eliminate midband attenuation. In addition, the emitter bypass circuit comprising the resistor 23 in series with the capacitor 24 in parallel with emitter resistor 20 of transistor 11 has been eliminated.

According to the invention, the treble tone control circuit 70 comprises a capacitor 71 connected to the lead 21 and to a terminal of a potentiometer 72. A second terminal of the potentiometer 72 is connected to a second capacitor 73 which is connected to a point 60 on the volume control potentiometer 50. A third capacitor 74 is connected from the same point 60 on the volume control potentiometer to the resistor 54 in the bass boost circuit and to the point 56 on the volume control potentiometer. The capacitor 58 found in the circuit of FIG. 1 is eliminated.

When the wiper 75 on the treble tone control potentiometer 72 is at or near its minimum position, the capacitor 71 is effectively shunted between the terminal 77 of the circuit to lead 21 to provide a cut in the treble frequencies of the audio signal. When the wiper 75 of the treble tone control potentiometer 72 is in series with the capacitor 71 between the terminal 77 and the lead 21 so that the shunting effect of the capacitor 71 for high frequencies is minimized. Thus, when the wiper 75 is near its maximum position, the treble frequencies are boosted.

At the same time that the wiper 75 is near its maximum position, little resistance of the potentiometer 72 is in series with the capacitor 73 so that capacitor 73 is effective to pass the high frequency components in the signal at terminal 77 through the wiper 75, capacitor 73, and the portion of the volume control potentiometer between point 60 and the output wiper 51. An additional path for the high frequency components is provided from point 60 on the output potentiometer 50 through the capacitor 74 and through the portion of the potentiometer between point 56 and the wiper 51. Thus, when the treble tone control potentiometer is turned towards its lower position, the shunting effect of capacitor 71 is increased to load the transistor stage to provide a high frequency rolloff, while at the same time reducing the treble boosting effect of capacitors 73 and 74 respectively. On the other hand, when the wiper 75 of the treble control potentiometer 72 is increased towards its maximum position, the treble frequencies are boosted by the action of capacitors 73 and 74 when the wiper 51 of the volume control potentiometer 50 is below its maximum position.

It has been found advantageous to use a treble control potentiometer 72 which has an S-taper characteristic. This feature results in a relatively linear control action as the manual knob connected to the wiper is manipulated.

It is an additional advantage of the circuit that the emitter bypass circuit described in connection with FIG. 1 may be eliminated. It has been found that using the circuit according to the invention permits the elimination of the emitter bypass circuit since the treble boost provided by the treble tone control circuit according to the invention eliminates its need.

The capacitor 71 is sized so that the gain at midband frequencies is not reduced when the wiper 75 is moved toward its lower position on the potentiometer 72, that is, toward the end connected to capacitor 71. The component values are chosen in such a manner that symmetrical treble and bass response is obtained. The following values provided an operative embodiment:

| Component | Value |
|---|---|
| Transistor 11 | NPN |
| Capacitor 13 | 0.02 μ |
| Resistor 14 | 10 megohms |
| Resistor 16 | 3.9 megohms |
| Resistor 17 | 12 K |
| Bias Source 18 | 20 volts |
| Resistor 20 | 2.2 K |
| Capacitor 26 | 0.1 μ |
| Potentiometer 31 | 200 K |
| Resistor 32 | 22 K |
| Capacitor 33 | 0.02 μ |
| Resistor 45 | 22 K |
| Capacitor 46 | 0.001 μ |
| Capacitor 48 | 0.02 μ |
| Potentiometer 50 | 200 K |
| Resistor 54 | 10 K |
| Capacitor 55 | 0.05 μ |
| Resistor 62 | 5.6 K |
| Capacitor 63 | 0.068 μ |
| Capacitor 71 | 0.01 μ |
| Potentiometer 72 | 200 K |
| Capacitor 73 | 0.0015 μ |
| Capacitor 74 | 0.001 μ |

Figure 3:
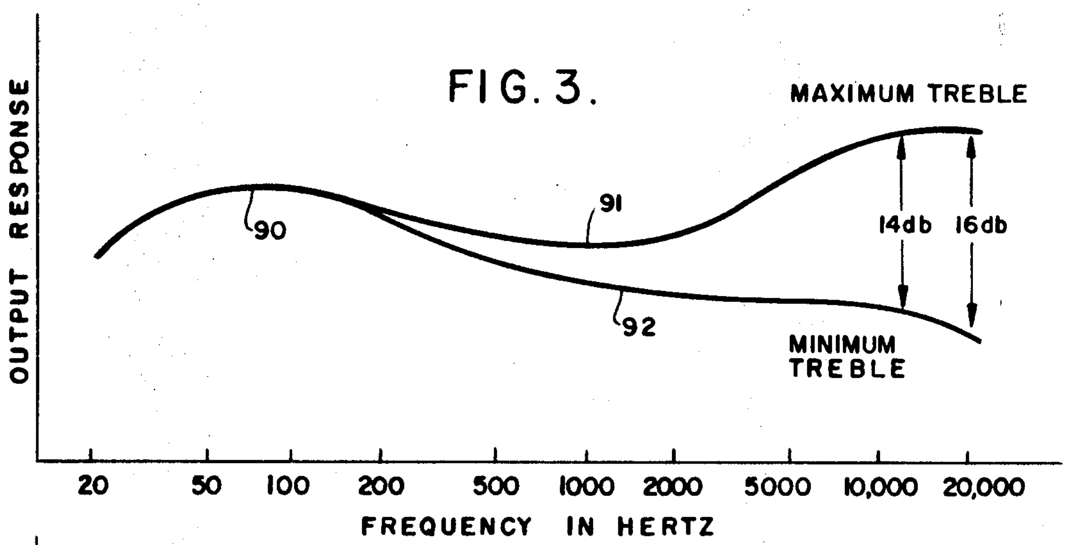
FIG. 3 is a plot of the frequency response of the circuit shown in FIG. 1 at maximum and minimum treble settings.
Figure 4:
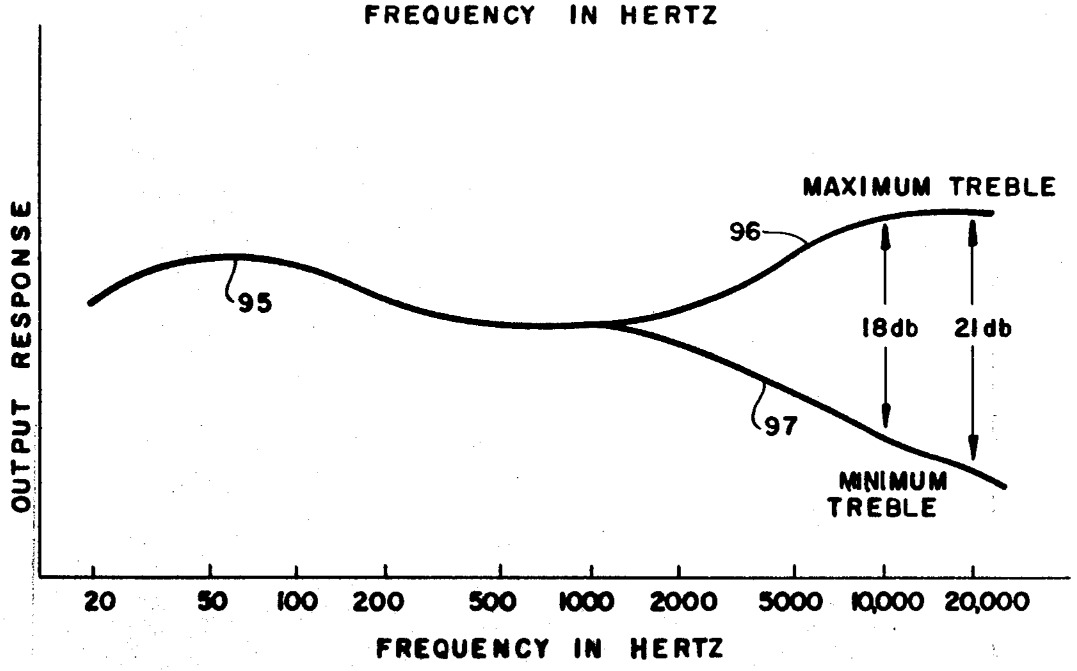
FIG. 4 shows the frequency response of the circuit incorporating the invention shown in FIG. 2, indicating the improvement in the output response and the greater maximum treble cut for the response at maximum and minimum treble settings.

The diagrams shown in FIGS. 3 and 4 demonstrate the greater maximum treble cut that is obtained with the circuits according to the invention. In FIG. 3, a response characteristic for the maximum and minimum settings of the treble control potentiometer 38 has been plotted in curve 90. At a relatively low frequency such as near 200 HERTZ, the maximum treble curve assumes the characteristic shown in the portion of the curve designated at 91. At the minimum treble setting for potentiometer 38, the curve assumes the contour designated at 92. At about 10,000 HERTZ there is a 14 db. difference between the maximum treble setting and the minimum treble setting, while that difference increases to about 16 db. at about 20,000 HERTZ, the generally accepted upper limit for observing audio amplifier characteristics.

The curves shown in FIG. 4 demonstrate the improvement according to the invention. In the first place, it should be noted that for the embodiment shown in FIG. 2, the curve designated at 95 of the overall response did not separate into the curve for the maximum treble setting designated at 96 and the curve for the response at the minimum treble setting designated at 97 until between 1,000 and 2,000 HERTZ. In addition, at about 10,000 HERTZ an 18 db. difference between the maximum and minimum treble settings was observed, while at 20,000 HERTZ, that difference had increased to 21 db. Thus, a 4 db. increase between the maximum and minimum treble setting was observed between the two circuits at 10,000 HERTZ and a 5 db. increase was observed at 20,000 HERTZ.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. In an audio amplifier having first and second circuit points establishing audio signals thereacross and volume control means coupled between said first and second points to control the volume of said signals, a treble tone control circuit comprising:

variable treble control means coupled to said first and second circuit points, first capacitance means coupling said variable treble control means to said second circuit point and constituting with said variable treble control means a first variable impedance means shunting high frequency components of said audio signals when a low-impedance state and shunting minimum high frequency components when in a high-impedance state, and second capacitance means coupling said variable treble control means to said volume control means and constituting with said variable treble control means a second variable impedance means, said second variable impedance means boosting the treble frequencies of said audio signals when in the low-impedance state.

2. A treble tone control circuit as recited in claim 1 wherein said second variable impedance means is in the low-impedance state when said first variable impedance means is in the high-impedance state and said second variable impedance means is in the high-impedance state when said first variable impedance means is in the low-impedance state.

3. A treble tone control circuit as recited in claim 1 wherein said first variable impedance means is a variable load to said audio amplifier providing high frequency rolloff when in the low-impedance state.

4. A treble tone control circuit as recited in claim 1 wherein said volume control means is a potentiometer coupled at its end points to said first and second circuit points and providing the output of said audio amplifier at its wiper, said variable treble control means is a potentiometer coupled at its wiper to said first circuit point, at one end point to said second circuit point by said first capacitance means and at the other end point to an intermediate tap on the volume control potentiometer by said second capacitance means, such that treble frequencies of said audio signals are boosted by said second variable impedance means when the volume control potentiometer wiper is below said intermediate tap and said second variable impedance means is in the low-impedance state.

5. A treble tone control circuit as recited in claim 4 further including third capacitance means coupled across said volume control potentiometer between said intermediate tap and a second intermediate tap of lower volume output, such that treble frequencies are additionally boosted by said volume control potentiometer is below said second intermediate tap.

6. A treble tone control circuit as recited in claim 5 wherein said treble control potentiometer has an S-taper characteristic to provide linear treble control.